United States Patent [19]
Prucnal

[11] Patent Number: 5,825,519
[45] Date of Patent: Oct. 20, 1998

[54] OPTICAL MACH-ZEHNDER TIME DIVISION DEMULTIPLEXER

[75] Inventor: Paul R. Prucnal, Princeton, N.J.

[73] Assignee: Princeton University, Princeton, N.J.

[21] Appl. No.: 722,482

[22] Filed: Sep. 27, 1996

[51] Int. Cl.$^6$ .............................. H04J 14/02; H04J 14/08
[52] U.S. Cl. ......................... 359/127; 357/123; 357/138; 285/11; 285/24
[58] Field of Search ...................................... 359/123, 127, 359/128, 138, 139, 156; 385/8, 9, 11, 24, 122

[56] References Cited

U.S. PATENT DOCUMENTS

| | | | |
|---|---|---|---|
| 5,307,428 | 4/1994 | Blow et al. | 385/11 |
| 5,357,359 | 10/1994 | Uchiyama et al. | 359/123 |
| 5,377,284 | 12/1994 | Biilow | 385/11 |
| 5,457,559 | 10/1995 | Saito et al. | 359/135 |
| 5,493,433 | 2/1996 | Prucnal et al. | 359/123 |
| 5,646,759 | 7/1997 | Lichtmann et al. | 359/138 |

OTHER PUBLICATIONS

Appl. Phys. Lett., 65 (3), 18 Jul. 1994, pp. 283–285, S. Nakamura et al., "Experimental investigation on high–speed switching characteristics of a novel symmetric Mach–Zehnder all–optical switch".

Appl. Phys. Lett., 67 (5), 31 Jul. 1995, pp. 605–607, K. I. Kang et al., "Demonstration of ultrafast, all–optical, low control energy, single wavelength, polarization independent, cascadable, and integratable switch".

Primary Examiner—Rafael Bacares
Attorney, Agent, or Firm—Ohlandt, Greeley, Ruggiero & Perle

[57] ABSTRACT

An optical demultiplexer includes a first optical path that includes a first nonlinear optical element (NLE) which responds to a control pulse to induce a 180° phase shift in an optical data signal propagating therethrough. The NLE responds rapidly to the control pulse but slowly reverts to a non-phase shift state. A second optical path is provided which includes a second NLE. An optical output coupler is connected to the first and second optical paths and responds to in-phase data pulses therefrom to output a data pulse on a first output. The optical output coupler is responsive to 180° phase shifted data pulses to output a corresponding data pulse on a second output. An input data source concurrently couples a train of optical data pulses of wavelength λ onto the first optical path and the second optical path. A control input induces a first control pulse of wavelength λ onto the first optical path and a second control pulse of wavelength λ onto the second optical path, the second control pulse delayed a time t from the first control pulse, whereby a data pulse occurring during time t, is phase delayed by 180 degrees by the first NLE but is not affected by an additional phase delay in the second NLE during time t.

7 Claims, 2 Drawing Sheets

OPTICAL MACH-ZEHNDER TIME DIVISION DEMULTIPLEXER

The invention described and claimed herein was made with partial support from the US Government under ARPA Contract F19628-94-C-0045.

FIELD OF THE INVENTION

This invention relates an ultra-fast optical demultiplexer for time division multiplexed data signals and, more particularly, to demultiplexer that employs a Mach-Zehnder interferometer arrangement.

BACKGROUND OF THE INVENTION

Since the observation of large optical nonlinearities in semiconductors materials near the resonance region, many optical switches based on such semi-conductor nonlinearities have been proposed. The transition of the optical nonlinearity in a semi-conductor when a strong optical pulse is applied is sufficiently fast to enable ultra-fast switching devices. However, such semiconductor devices exhibit a slow recovery time that is related to interband recombination. Through use of the fast turn-on operation in a gallium arsenide etalon, an additional etalon in series has been used for the ultra-fast turn-off operation. Using such a configuration, a switching window of 40 picoseconds has been achieved, even though the etalons exhibit 30 nanosecond recovery times.

The use of such switching devices has recently been applied to interferometric-type devices, based on the Sagnac and Mach-Zehnder configurations. A switching device based upon the Sagnac configuration is disclosed in U.S. Pat. No. 5,493,433 of Prucnal and Sokoloff, assigned to the same Assignee as this application. An asymmetric Mach-Zehnder switching system is disclosed by Nakamura et al. in "Experimental Investigation on High-Speed Switching Characteristics of a Novel Symmetric Mach-Zehnder All Optical Switch", Applied Physics Letters, Vol. 65, No. 3, Jul. 18, 1994 (pages 283–285).

FIG. 1 hereof illustrates the switch proposed by Nakamura et al. which includes a pair of nonlinear elements 10 and 12 that are positioned in a pair of optical paths 14 and 16. Data signals are applied to a coupler 18 which induces the data signals into both optical paths 14 and 16. The data signals are laser pulses at a wavelength of 900 nanometers. A first-control pulse, at a wavelength of 878 nanometers, is induced into control path 20 and a second control pulse at the same wavelength is induced into second control path 22, but is displaced in time by a switching window. Wavelength selective couplers induce the respective control pulses into optical paths 14 and 16.

If it is assumed that the first control pulse arrives first in time, nonlinear element 10 causes data pulses appearing thereafter in optical path 14 to be phase shifted by, e.g., 180° or π. However, since the second control pulse appears a switching window later, data pulses appearing thereafter in optical path 16 are also phase delayed by 180°. Thus, only data pulses occurring between the onset of the first control pulse and the onset of the second control pulse have different phases outputted from nonlinear elements 10 and 12.

As a result, coupler 24 outputs the in-phase data pulses onto upper output optical path 26 and only the data pulses that occur within the switching window and exhibit a 180° phase difference are coupled onto lower output optical path 28.

Because, however, that different wavelength data and control signals are employed by Nakamura et al., precise phase synchronization thereof is difficult due to the requirement of synchronously mode-locking two lasers operating at different wavelengths as well as the difference in propagation speeds of the two pulses. This fact becomes important when highly accurate picosecond level switching is desired. Further, if any leakage of the control pulse occurs through the nonlinear optical elements, it too appears in the output like paths as noise.

Accordingly, it is an object of this invention to utilize identical optical wavelength data and control pulses in a Mach-Zehnder optical demultiplexer.

It is another object of this invention to provide an improved Mach-Zehnder optical demultiplexer wherein control and data pulses are easily separated, with the control pulses thereby being prevented from creating noise in the output of the optical demultiplexer.

It is a further object of this invention to provide a Mach-Zehnder optical demultiplexer wherein accurate synchronization of control and data pulses allows the provision of ultra-short switching windows.

SUMMARY OF THE INVENTION

An optical demultiplexer includes a first optical path that includes a first nonlinear optical element (NLE) which responds to a control pulse to induce a 180° phase shift in an optical data signal propagating therethrough. The NLE responds rapidly to the control pulse but slowly reverts to a non-phase shift state. A second optical path is provided which includes a second NLE. An optical output coupler is connected to the first and second optical paths and responds to in-phase data pulses therefrom to output a data pulse on a first output. The optical output coupler is responsive to 180° phase shifted data pulses to output a corresponding data pulse on a second output. An input data source concurrently couples a train of optical data pulses of wavelength $\lambda$ onto the first optical path and the second optical path. A control input induces a first control pulse of wavelength $\lambda$ onto the first optical path and a second control pulse of wavelength $\lambda$ onto the second optical path, the second control pulse delayed a time t from the first control pulse, whereby a data pulse occurring during time t, is phase delayed by 180 degrees by the first NLE but is not affected by an additional phase delay in the second NLE during time t. Such a data pulse exits from the optical output coupler via the second output. The input control pulses are polarized orthogonally with respect to the data pulses and are blocked by analyzers in the output optical paths.

DETAILED DESCRIPTION OF THE INVENTION

Figure 1:
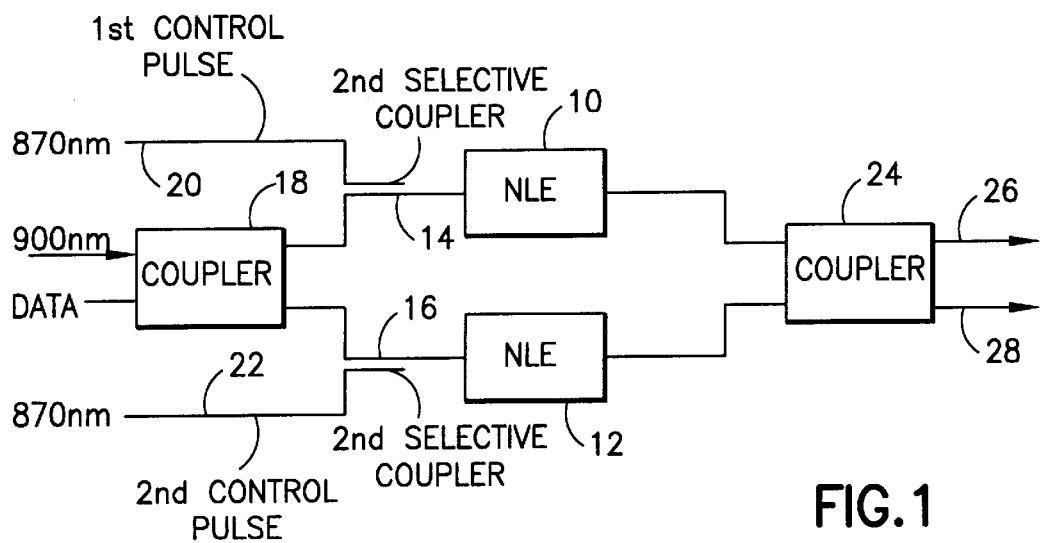
FIG. 1 is a diagram of a prior art Mach-Zehnder optical demultiplexer.
Figure 2:
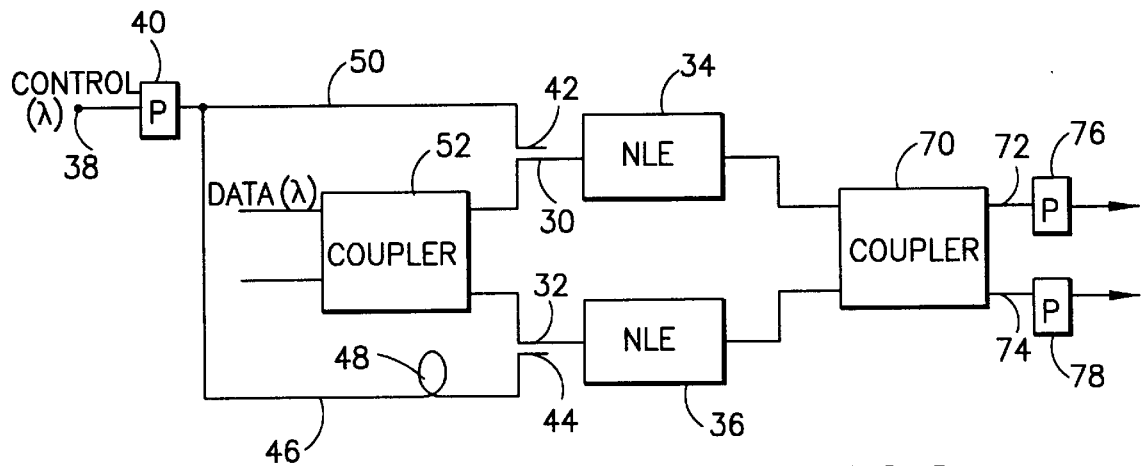
FIG. 2 is a diagram of a Mach-Zehnder optical demultiplexer incorporating the invention hereof.

Referring now to FIG. 2, a Mach-Zehnder interferometric demultiplexer is illustrated including a first optical path 30 and a second optical path 32. A non-linear optical element 34 is positioned in optical path 30 and a nonlinear element 36 is positioned in optical path 32. Control pulses are applied to a terminal 38, pass through a polarizer 40, and are thereafter induced into optical paths 30 and 32 via couplers 42 and 44, respectively.

To achieve a switching window, one control pulse experiences a time delay "t" in control path 46 as a result of being passed through an extended length of optical fiber or waveguide 48. By contrast, the polarized control pulse in control path 50 experiences no such delay. As will be hereafter understood, the time delay induced by fiber 48 defines the length of a switching window in the optical demultiplexer of FIG. 2.

Data pulses are applied via a coupler 52 and optical paths 30 and 32 to nonlinear optical elements 34 and 36, respectively. Note that both the data pulses and control pulses exhibit an identical wavelength λ, and thereby may be precisely synchronized as a result of having been derived from a single laser source. Because both control pulses are derived from a single source pulse, the switching window can be made arbitrarily short by making optical delay 48 suitably short.

A data signal launched from the data input splits into two identical signals at coupler 52. Each signal travels through a respective upper or lower optical path, the respective NLE in the path and further splits into two signals at coupler 70. At the output of coupler 70, the signals from the upper and lower optical paths interfere with each other. By adjusting the length of each optical pathway, with respect to each other so that there is an exact 180° difference in path distance, complete destructive interference takes place at coupler 70 (when no control pulse is present). Thus, data signals which interfere constructively exit on output line 72, whereas signals which interfere destructively appear on data output line 74.

The interference between data signals in the upper and lower optical pathways is destroyed by introducing a control signal from control input 38 to cause one of NLE's 34/36 to cause a further 180° phase shift in the optical signals passing therethrough.

Figure 2A:
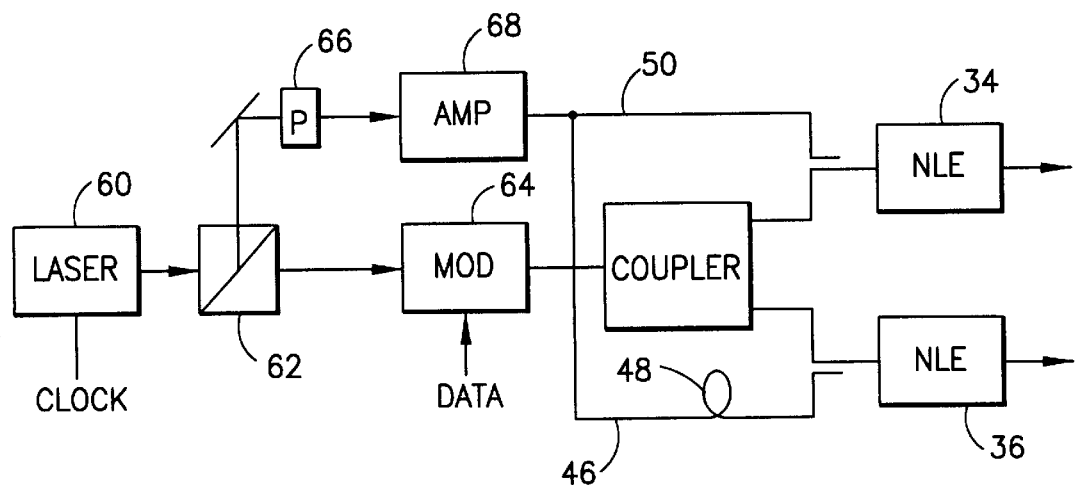

Referring briefly to FIG. 2(a), a single laser source 60 is illustrated which, in response to applied clock signals outputs optical clock pulses to a splitter 62 which applies one-half of the clock pulses to a modulator 64 and one-half through a polarizer 66 to an amplifier 68. The optical clock pulse outputs from amplifier 68 are applied as control signals, in either an undelayed form via path 50 or, in a delayed form via fiber delay 48 to coupler 44.

The clock pulses applied to modulator 64 are modulated by applied data signals and are then applied via coupler 52 to optical paths 30 and 32, respectively. In such manner, the data and control pulses are derived from a single laser source and are, thereby able to be readily synchronized.

Figure 3:
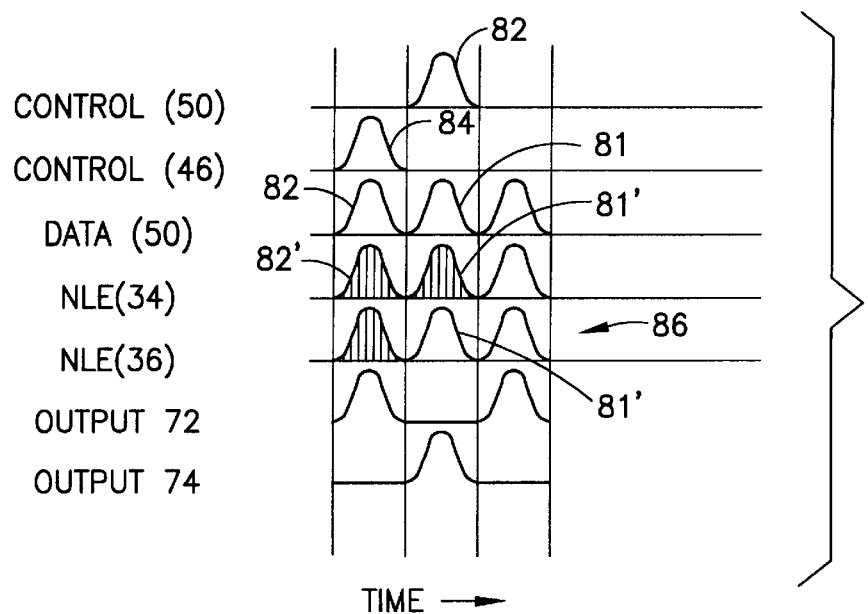
FIG. 3 is a waveform/timing diagram helpful in understanding the operation of the Mach-Zehnder optical demultiplexer of FIG. 2.

Referring now to FIGS. 2 and 3 in conjunction, the demultiplexing action of FIG. 2 will be described. Control pulses in upper control path 50 are timed synchronously with the data pulses that are applied to coupler 52. In NLE 34, data pulse 81 in the same time slot as control pulse 82 and data pulses occurring thereafter (pulse 82), experience a 180° phase shift, and this phase shift continues as long as the nonlinearity of NLE 34 persists. The phase shifted pulses are shown as pulse train 80, with the phase shifted pulses 81' and 82' shaded with vertical bars. It can thus be seen that in the output of NLE 34, the first pulse in the sequence is not shifted, but the second and third pulses of sequence 80 experience a 180° phase shift.

By contrast, lower optical path 32 receives control pulses which are timed so that they fall in a time slot immediately following the data time slots to be multiplexed. Thus, control pulse 84 occurs after data pulse 81 which, as will be seen hereafter, is the data pulse to be demultiplexed. In optical path 32, therefore, data pulse 81 does not experience a 180° phase shift due to the fact that control pulse 84 does not arrive until the next time slot (coincident with data pulse 82). However, as can be seen by waveform 86, the first two data pulses therein experience no 180° phase shift from NLE 36, while the last data pulse does experience a 180° phase shift due to the concurrent arrival of control pulse 84.

As can therefore be seen, data pulse 81 in optical path 30 and data pulse 81' in optical path 32 are the only data pulses which experience a differential phase shift in the respective pathways (and constructive interference in coupler 70). Therefore, only data pulse 81 exits from coupler 70 via output path 74, with the remaining data pulses exiting via output path 72. The control pulses are excluded from the output by the presence of polarizers 76 and 78, respectively.

The maximum switching speed of the demultiplexer of FIG. 2 depends only on the rise time of the nonlinear effect (which is typically on the order of 100 femtoseconds) and the differential delay t between the two control pulses. This differential delay can be made arbitrarily short using passive optical delays.

A preferred implementation for the demultiplexer of FIG. 2 employs integrated optical waveguides, either made from semiconductor materials or lithium niobate, or perhaps glass or a polymer. The NLE devices can be made with a nonlinear optical material such as a semiconductor or lithium niobate or a doped polymer, or if a hybrid implementation is used, a semiconductor optical amplifier or other nonlinear material can be introduced in a slot in a waveguide of another material. For example, a glass waveguide can be used, wherein slots are left open for the nonlinear elements. Then, gallium arsenide/aluminum gallium arsenide semiconductor optical amplifiers can be positioned in the open slots.

Figure 4:
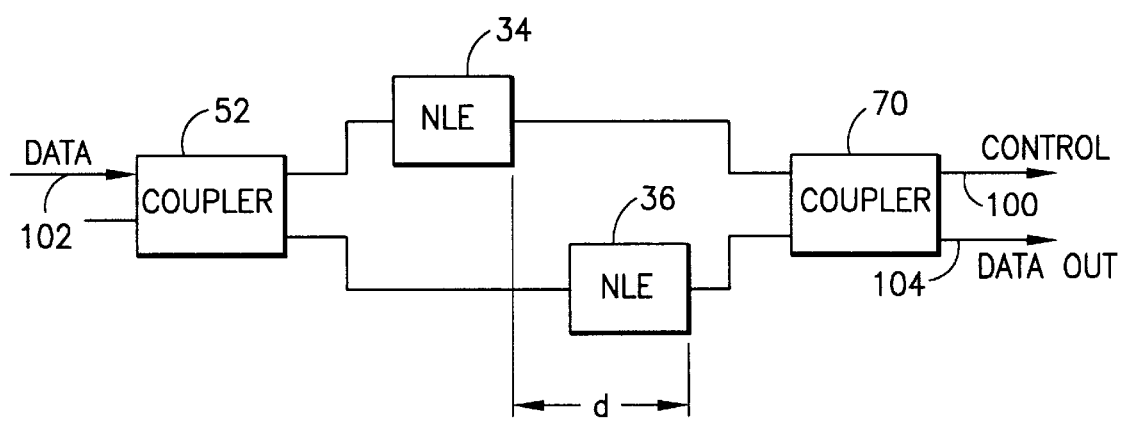
FIG. 4 is a further embodiment of a Mach-Zehnder optical demultiplexer incorporating the invention which requires no difference in polarization between control and data pulses.

Turning now to FIG. 4, a further embodiment of the demultiplexer will be shown which avoids the need for crossed polarization of the control and data pulses. In FIG. 4, like elements that are identical in structure to those shown in FIG. 2 are numbered identically. In lieu, however, of the control pulses being coupled into NLE's 34 and 36 in the forward direction of data propagation, the control pulses are applied via path 100 to an output terminal of coupler 70. Further, NLE's 34 and 36 are offset by a distance d which defines the switching window of the demultiplexer of FIG. 4. The length of the upper and lower optical paths are almost the same except for a small optical path-length difference that provides a 180° phase shift between them.

A data signal launched from data input 102 splits into two identical signals at coupler 52. Each signal travels through a respective upper or lower optical path, the respective NLE in the path and further splits into two signals at coupler 70. At the output of coupler 70, the signals from the upper and lower optical paths interfere with each other in the manner above described. By adjusting the length of each optical pathway, with respect to each other so that there is an exact 180° difference in path distance, complete destructive interference takes place at coupler 70. Thus, data signals which interfere constructively exit on control line 100, whereas signals which interfere destructively appear on data output line 104.

The interference between data signals in the upper and lower optical pathways is destroyed by introducing a control signal from control input 100 to cause one of NLE's 34/36 to cause a further 180° phase shift in the optical signals passing therethrough. This causes a "demultiplexer-on" operation. The duration of the demultiplexer-on action depends on the separation distance d between NLEs 34 and 36. More specifically, the control pulse is applied to both the upper and lower optical pathways and arrives at NLE 36 some time t before it arrives at NLE 34. Only during this time do the data signals passing through NLE 36 experience a 180° phase shift, while the same data signals experience no similar phase shift in NLE 34. After time t, both data signals experience the identical phase shift and the destructive interference recurs. During time t, the interference is constructive and the data is output on line 104. Because the destructive interfering pulses appear on control line 100, they do not affect the operation of the control pulse and are ignored. In this manner, no special polarization is required of the data and control pulses.

A demultiplexer, such as shown in FIG. 4, was constructed and achieved a 10 picosecond switching window with 0.65 picoJoules of control pulse energy. Each NLE was a semiconductor optical amplifier and the phase shift was achieved by utilizing the large optical non-linearity associated with gain compression thereof. The demultiplexer was operated with a single wavelength of 1.313 micrometers and required no orthogonal polarization between the control and data pulses.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. An optical demultiplexer comprising:

a first optical path including a first nonlinear optical element (NLE) which responds to a control pulse to induce a $\pi$ phase shift in an optical data signal propagating therethrough, an NLE responding substantially immediately to a control pulse, but slowly reverting to a non-phase shift state thereafter;

a second optical path including a second NLE;

an optical output coupler coupled to said first optical path and said second optical path and responsive to in-phase data pulses thereon to output a data pulse on one output and further responsive to data pulses that are phase separated by $\pi$ to output a data pulse on a second output;

input means for coupling a train of optical data pulses of wavelength $\lambda$ concurrently onto said first optical path and said second optical path;

control means for inducing a first control pulse of wavelength $\lambda$ onto said first optical path and a second control pulse of wavelength $\lambda$ onto said second optical path, each control pulse polarized orthogonally from said data pulses, said first control pulse arriving at said first NLE a time t later than said second control pulse arrives at said second NLE, whereby only data pulses arriving concurrently during time t at said first NLE and second NLE experience phase shifts which differ by $\pi$ and thus are discriminated onto one output of said optical output coupler; and analyzer means for blocking any polarized control pulses that appear on said one output.

2. The optical demultiplexer as recited in claim 1, wherein said first optical path and second optical path differ in optical length by $n\pi$, and n is a small number.

3. The optical demultiplexer as recited in claim 1, wherein said control means comprises:

a first control path and a second control path, said first control path having an optical length at wavelength $\lambda$ that delays a control pulse of wavelength $\lambda$ a time t longer than a control pulse of wavelength $\lambda$ induced on said second control path.

4. The optical demultiplexer as recited in claim 1, wherein each NLE is comprised of a nonlinear optical material having a refractive index that is altered upon receipt of a control pulse.

5. An optical demultiplexer comprising:

a first optical path including a first nonlinear optical element (NLE) which responds to a control pulse to induce a $\pi$ phase shift in an optical data signal propagating therethrough, an NLE responding substantially immediately to a control pulse but slowly reverting to a quiescent state thereafter;

a second optical path including a second NLE;

an optical output coupler having a first input coupled to said first optical path and a second input coupled to said second optical path, and responsive to in-phase data pulses thereon to output a data pulse on one output terminal and to data pulses that are phase separated by $\pi$, to output a data pulse on a second output terminal, said first NLE and second NLE spaced along said first optical path and second optical path from said first input and second input, respectively, by an optical signal propagation time t difference;

input means for concurrently coupling a train of optical data pulses of wavelength $\lambda$ onto said first optical path and said second optical path;

control means for inducing a control pulse of wavelength $\lambda$ onto said one output terminal of said optical output coupler, said control pulse arriving at one said NLE a time t later than at another said NLE, whereby only data pulses arriving concurrently during said time t at said first NLE and second NLE experience phase shifts which differ by $\pi$ and thus are discriminated onto said second output of said optical output coupler.

6. The optical demultiplexer as recited in claim 5, wherein said first optical path and second optical path differ in optical length by $n\pi$, and n is a small number.

7. The optical demultiplexer as recited in claim 5, wherein each NLE is comprised of a nonlinear optical material having a refractive index that is altered upon receipt of a control pulse.

* * * * *

UNITED STATES PATENT AND TRADEMARK OFFICE
CERTIFICATE OF CORRECTION

PATENT NO. : 5,825,519
DATED : 10/20/98
INVENTOR(S) : Paul R. Prucnal

It is certified that error appears in the above-identified patent and that said Letters Patent is hereby corrected as shown below:

Cancel claims 5-7

Signed and Sealed this

Eighth Day of June, 1999

Attest:

Q. TODD DICKINSON

*Attesting Officer*                *Acting Commissioner of Patents and Trademarks*